March 5, 1935.  R. E. MARSHALL  1,993,216
LOADING OF PIPE AND LIKE OBJECTS
Filed Nov. 18, 1929   3 Sheets-Sheet 1
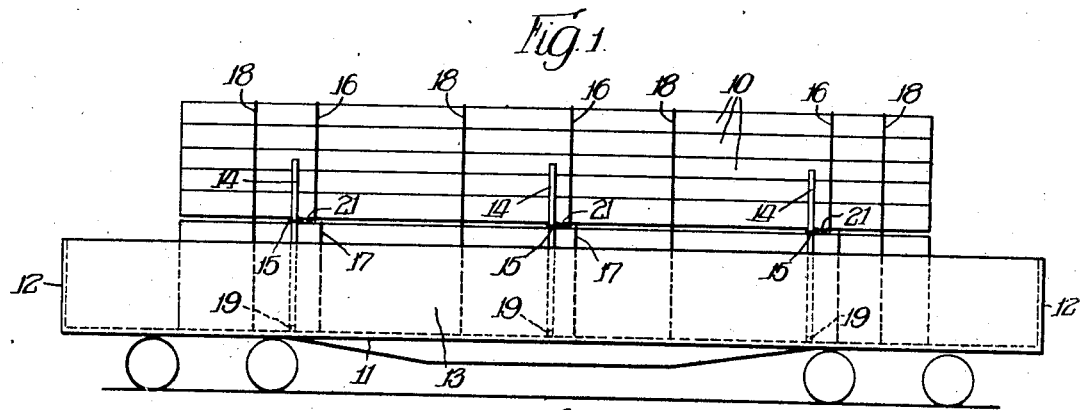
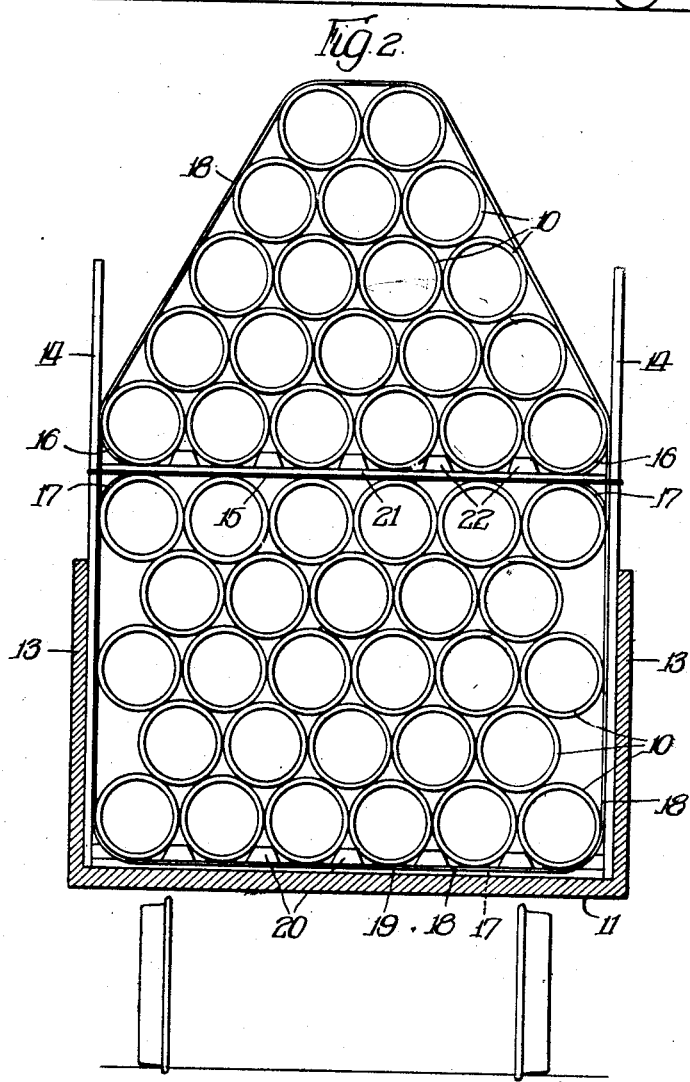
Inventor
Roy E. Marshall,
By Cromwell, Greist & Warden attys.

March 5, 1935.  R. E. MARSHALL  1,993,216
LOADING OF PIPE AND LIKE OBJECTS
Filed Nov. 18, 1929   3 Sheets-Sheet 2
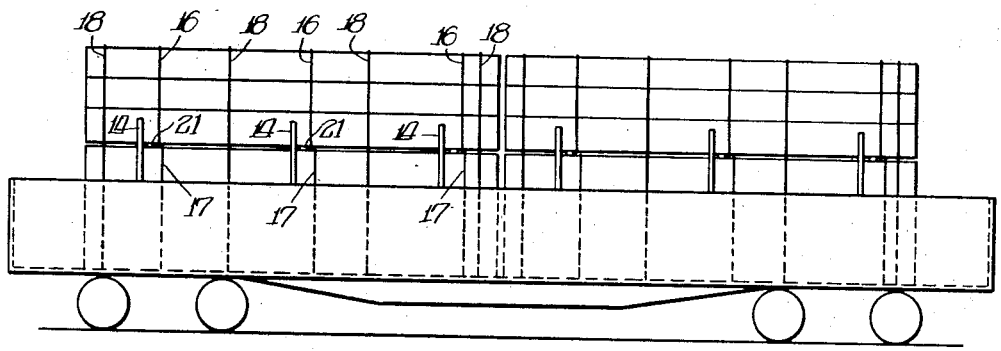
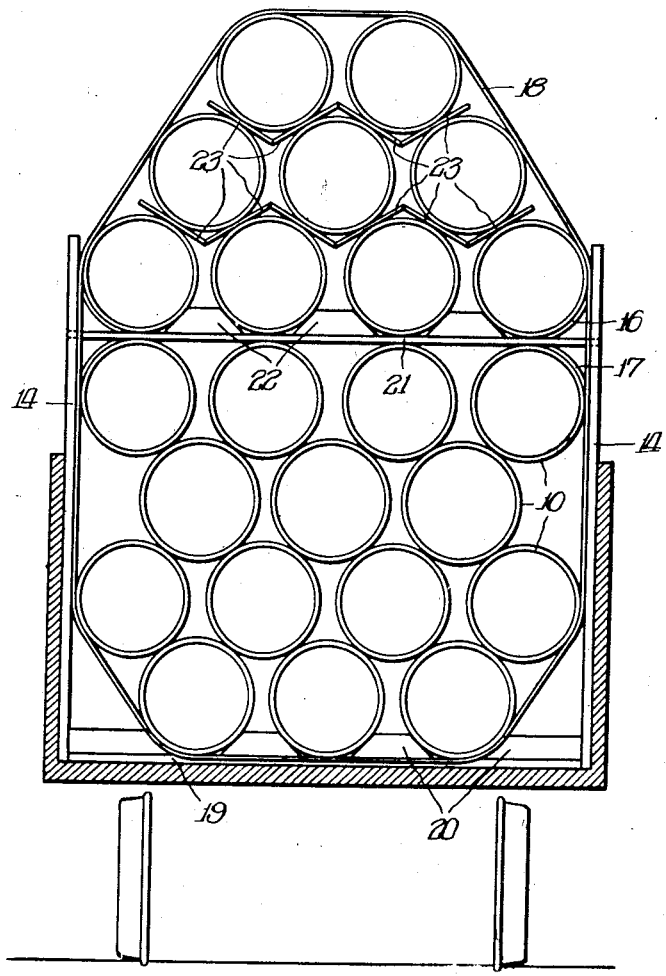
Inventor:
Roy E. Marshall, March 5, 1935.  R. E. MARSHALL  1,993,216
LOADING OF PIPE AND LIKE OBJECTS
Filed Nov. 18, 1929   3 Sheets-Sheet 3

Inventor:
Roy E. Marshall,

UNITED STATES PATENT OFFICE 1,993,216

LOADING OF PIPE AND LIKE OBJECTS

Roy E. Marshall, La Grange, Ill., assignor to The Gerrard Company, Inc., Chicago, Ill., a corporation of Delaware Application November 18, 1929, Serial No. 407,995

2 Claims. (Cl. 105—367)

This invention has to do with carload shipments of long heavy cylindrical objects, such as large steel pipe.

The transportation of pipe is a matter which for many years has been a perplexing problem to shippers. Under the loading methods heretofore practiced, disarrangement and damage to the pipe during transit, and even derailment of the car owing to such disarrangement, have been common occurrences.

The object of this invention is to provide a satisfactory way of arranging and fastening together lengths of pipe or like objects in a carload shipment, whereby to increase the tonnage and insure arrival at destination in good condition.

While the foregoing statements are indicative in a general way of the nature of the invention, other more specific objects and advantages will be evident to those skilled in the art upon a full understanding of the manner of loading contemplated.

Three different load arrangements coming within the purview of the invention are herein presented, but it will of course be appreciated that the invention may be embodied in still other slightly different arrangements coming within the scope of the appended claims.

In the accompanying drawings:

Fig. 1 is a side view of a car loaded with pipe in accordance with the invention;

Fig. 2 is an end view of the load shown in Fig. 1;

Fig. 3 is an side view of a car loaded with pipe in a slightly different way but also in accordance with the invention;

Fig. 4 is an end view of the load shown in Fig. 3;

Figure 5:
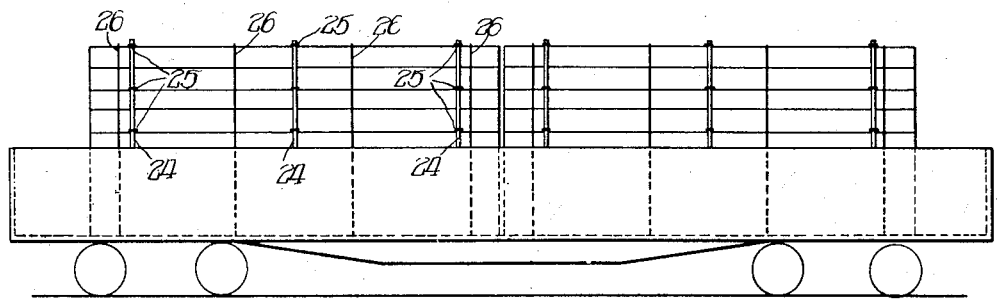
Fig. 5 is a side view of a car loaded with pipe in still another way in accordance with the invention.

The load illustrated in Figs. 1 and 2 will be described first. As will be observed in those views, the pieces of pipe 10 to be shipped are arranged lengthwise of the car 11 in a high pile which is preferably, though not necessarily, positioned with the ends thereof in spaced relation to the ends 12 of the car. The lower portion of the pile is confined between the sides 13 of the car and is of generally rectangular cross-section, while the upper portion of the pile is above the sides of the car and is of generally pyramidal cross-section.

A plurality of upright wooden stakes 14—preferably six in number—are placed in oppositely disposed pairs between the sides of the pile and the sides of the car, and the stakes in each pair are tied together just above the level of the sides of the car by tensioned wires 15 which pass horizontally through the pile between the upper and lower portions of the latter. The wires 15 are preferably double.

The pieces of pipe in the upper pyramidal portion of the pile above the cross wires 15 are tied into a bundle by a plurality of tensioned wires 16—preferably three in number, while the pieces of pipe in the lower portion of the pile below the cross wires 15 are tied into a separate bundle by a plurality of tensioned wires 17—preferably three in number. Both the upper and the lower portions of the pile are tied together by a plurality of tensioned wires 18—preferably four in number.

The pieces of pipe in the bottom row in the pile are supported upon a plurality of cross members 19—preferably three in number—and are separated uniformly by spacer blocks 20 which are attached to the upper surfaces of the members 19. Similarly, the pieces of pipe in the bottom row of the upper pyramidal portion of the pile are supported upon cross members 21—preferably three in number—and are maintained in properly spaced relation by spacer blocks 22 which are attached to the upper surfaces of the members 21. The cross members 19 are preferably positioned between the lower ends of the stakes 14, while the cross members 21 are preferably positioned just to one side of the stakes. The uppermost row in the lower portion of the pile and the lowermost row in the upper portion are preferably composed of the maximum number of pieces of pipe, which arrangement permits of an extremely heavy tonnage without endangering the stability of the load.

The load above described is easy to make up, possesses excellent riding properties, is quite stable, and permits of extremely heavy tonnage. The cost of the material required in making up the load is negligible, and the load may be subjected to the most severe jars, bumps and racking stresses without losing its form. The arrangement of the stakes and the wires permits the load to shift a little as a unit endwise of the car when the car is subjected to an unusually hard blow.

The procedure followed in making up the load is, briefly, as follows:

The stakes 14 are placed in upright positions against the sides of the car, in oppositely disposed pairs, the cross members 19 with the blocks 20 attached are inserted between the stakes, and the wires 17 which are to extend about the lower portion only of the pile, as well as the wires 18 which are to extend about the entire pile, are laid across the bottom of the car and over the sides, after which the pieces of pipe making up the lower portion of the pile are placed on the cross members over the wires and between the stakes. As soon as the pile has reached a height a little above the edges of the sides of the car, the stakes are tied together by the cross wires 15, the ends of the wires 17 are fastened together, the cross members 21 with the blocks 22 attached are placed on the completed lower portion and the wires 16 which are to extend about the upper portion only of the pile are laid across the top of the lower portion, after which the remaining pieces of pipe are added to the pile and arranged in pyramidal form. Finally, the ends of the wires 16 and the ends of the wires 18 are carried up over the top of the finished pile and fastened together.

The load shown in Figs. 3 and 4 employs the same arrangement of stakes and tie wires as the load shown in Figs. 1 and 2. The primary difference in the two loads is the employment of a plurality of small wooden strips 23 which are positioned tangentially betwen the pieces of pipe in the several rows of the upper portion of the pile. The strips 23 serve as friction members to prevent relative endwise movement between the pieces of pipe in the upper portion, in which portion the tendency for such movement is greater than in the lower portion.

Figure 6:
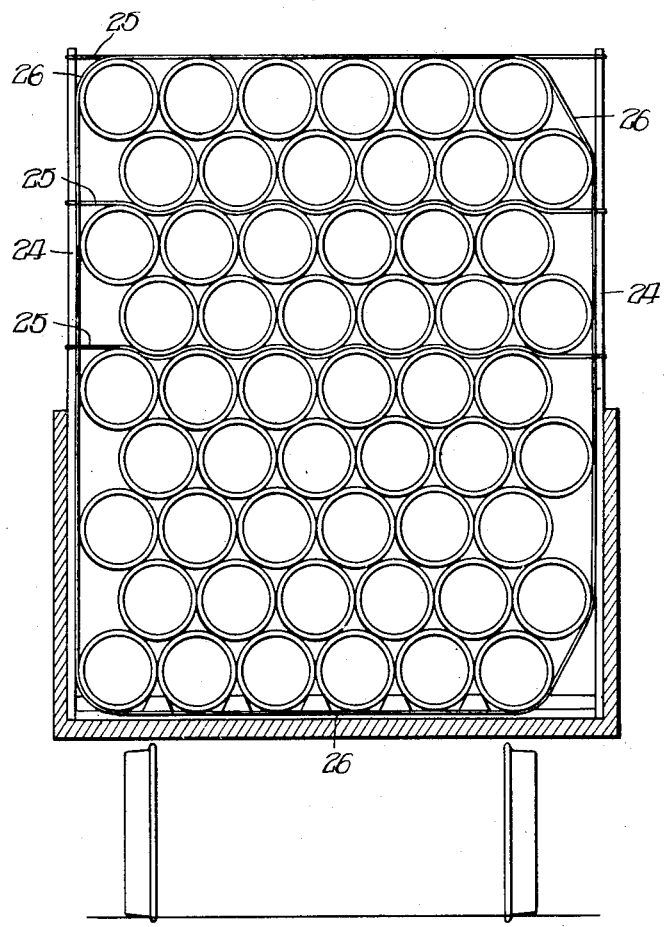
Fig. 6 is an end view of the load shown in Fig. 5.

The load shown in Figs. 5 and 6 exemplifies a form of the invention wherein the pieces of pipe or other objects are arranged in square, as distinguished from pyramidal, form. In this form, a plurality of stakes 24 the full height of the pile are placed upright in oppositely disposed pairs between the sides of the pile and the sides of the car and are tied together through and above the pile by horizontally extending wires 25 under tension, which wires are preferably separated from each other by about eighteen inch intervals. A plurality of wires 26 are tied at regular intervals about the entire pile.

I claim:
1. A method of loading railway cars with metal pipe, which comprises providing the car with a plurality of pairs of oppositely disposed uprights, building a plurality of tiers of pipe with the pipe in adjacent tiers in staggered and inter-nesting relation to each other, binding said tiers together to form a bundle, providing spacer strips on the surface formed by the upper tier of the bundle, cross-tying said oppositely disposed uprights even with the top of the bundle, building up additional tiers with the pipe in adjacent tiers in staggered and inter-nested relation to each other and with the pipe in each tier gradually reduced in number, positioning inclined friction members between said additional tiers, securely binding said additional tiers together under compression with said friction members to form a separate bundle, and thereafter tying both bundles together to securely bind the load.

2. A load for railway shipment, comprising, in combination with a railway car, a pile of metal pipe or like objects arranged lengthwise of the car and divided into a lower portion and an upper portion, the pieces of pipe in the lower portion of the pile being bound together under tension as a unit in a formation of generally rectangular cross section in superimposed alternately long and short inter-nesting rows ending in a long top row, the pieces of pipe in the upper portion of the pile being bound together under tension as a separate unit in a formation of generally pyramidal formation in superimposed rows starting in a long bottom row in direct non-nesting opposition to the top row in the lower portion of the pile and continuing upwardly in progressively shorter inter-nesting rows, cross members positioned on the top of the lower portion of the pile beneath the upper portion for supporting the latter, and inclined friction strips between the inter-nesting rows in the upper separately bound portion of the pile.

ROY E. MARSHALL.